United States Patent [19]

McLaughlin

[11] Patent Number: 5,791,679
[45] Date of Patent: Aug. 11, 1998

[54] TORQUE ROD CONFIGURATION

[75] Inventor: Ronald J. McLaughlin, Maumee, Ohio

[73] Assignee: The Pullman Company, Milan, Ohio

[21] Appl. No.: 689,923

[22] Filed: Aug. 16, 1996

[51] Int. Cl.⁶ ........................................................ B60G 5/00
[52] U.S. Cl. ........................... 280/673; 280/716; 280/663; 280/725
[58] Field of Search ............................... 280/663, 665, 280/673, 716, 725

[56] References Cited

U.S. PATENT DOCUMENTS 2,994,396  8/1961  Bidwell ........................ 280/663
3,069,185  12/1962  Holmstrom ................... 280/663
4,457,536  7/1984  Rumpel ......................... 280/663
4,703,947  11/1987  Tattermusch et al. ......... 280/665

Primary Examiner—Kenneth R. Rice
Attorney, Agent, or Firm—Harness, Dickey & Pierce PLC

[57] ABSTRACT

An improved torque rod assembly is provided for connecting a vehicle axle to a frame comprising a torque rod with forged ends, each forged end having an eyelet and a cylindrical bar pin extending therethrough wherein the torque rod assembly is adaptable to a plurality of mounting angles.

13 Claims, 3 Drawing Sheets

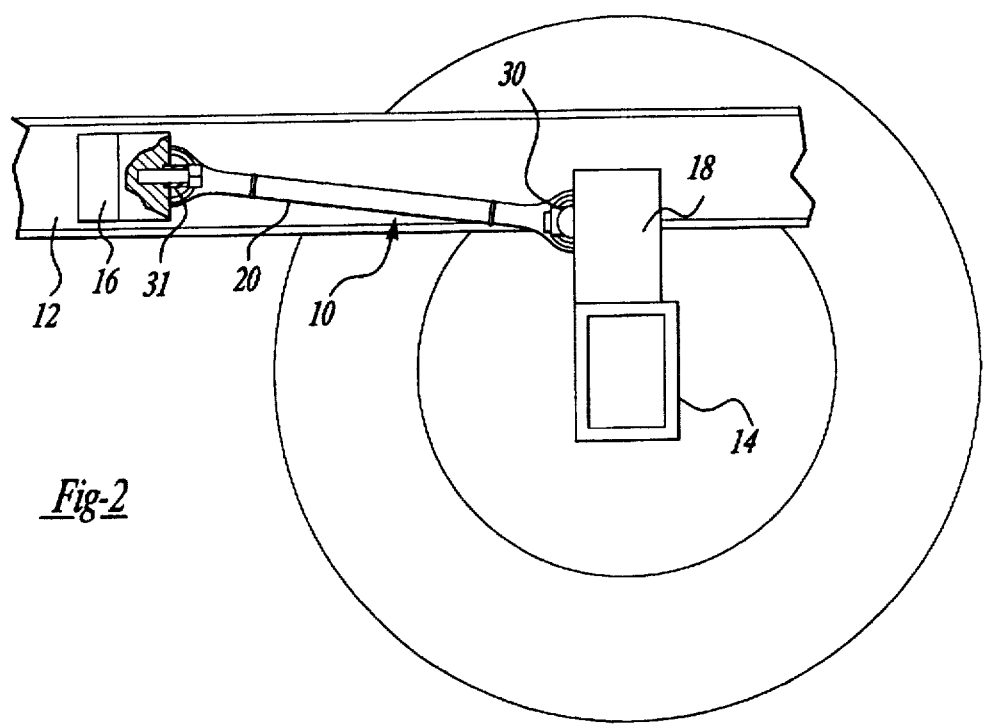
Fig-2
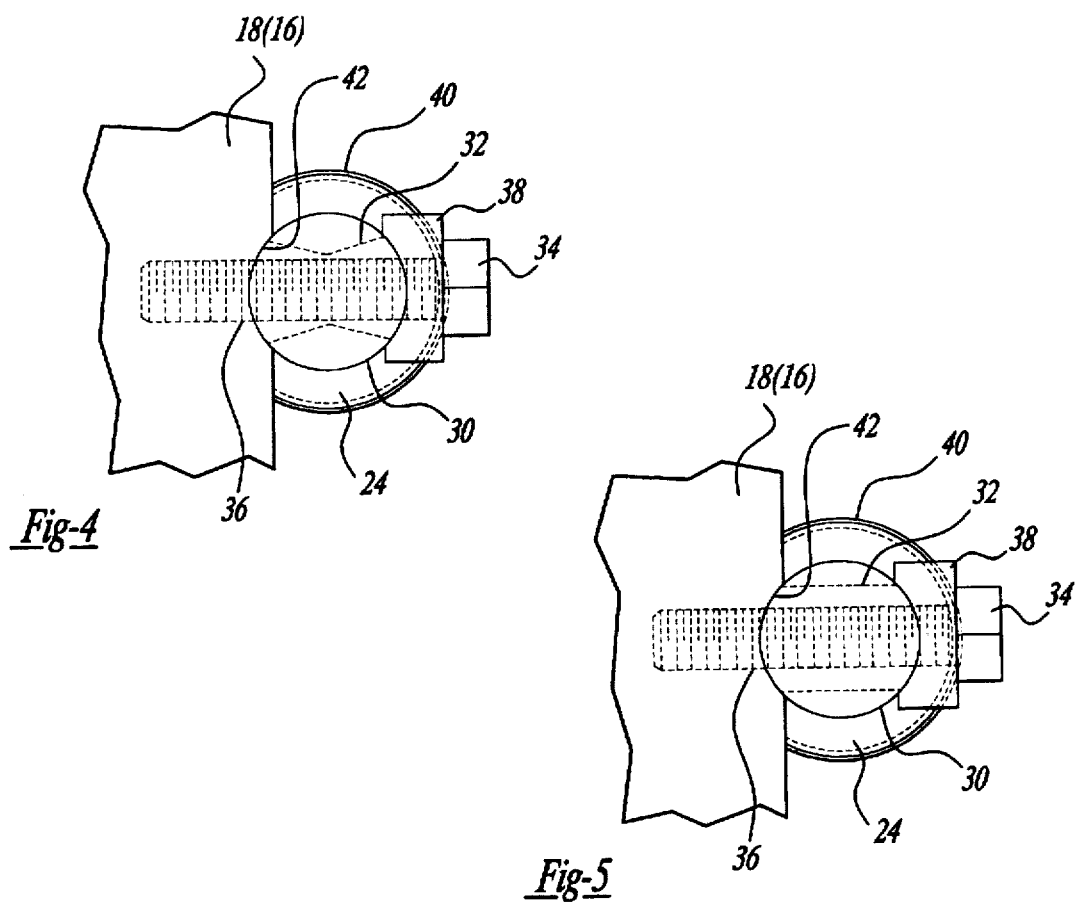
Fig-4
Fig-5

TORQUE ROD CONFIGURATION

BACKGROUND OF THE INVENTION

This invention relates to a torque rod assembly adaptable for use in truck and bus applications to connect axle assemblies to frame members of vehicles. More particularly, the invention is directed to an improved torque rod assembly adaptable to a plurality of mounting angles.

While the invention is particularly directed to the art of vehicle suspension systems, and will thus be described with specific reference thereto, it will be appreciated that the invention may have utility in other fields and applications.

Torque rod assemblies are used in heavy vehicle suspension systems to maintain the stability of the axle assembly. Torque rods typically have forged ends and are attached to the axle assembly and frame members, respectively, by the use of cylindrical bar pins extending through the forged ends. Elastomer bushings may also be used in the ends of torque rods in conjunction with the bar pins to absorb shock, maintain the tracking of wheels to the centerline of travel, and resist forces and deflections encountered in turning the vehicle. A torque rod generally functions best if the elastomer bushing in the forged ends of the rod are arranged so that a longitudinal axis thereof is perpendicular to the centerline of the vehicle.

Because of design or manufacturing problems or differences, the torque rod is often misaligned in mounting, thus making it difficult to mount the rod on both the axle and the frame. When this has occurred in the past, it has been necessary to bend the spacer of the torque rod to a suitable curvature and then use special tools and operations to attach the bar pins to the ends of the torque rods, which of course adds to production costs.

Moreover, because it is harmful to subject elastomer bushings to stress prior to assembly, it has also been necessary to design and manufacture torque rods with various angles between the bar pins and the torque rod centerline. Mounting in this situation requires creating a flat surface on each end of the bar pins and piercing a hole through each end, which receives mounting bolts for attaching the bar pins to the supporting brackets. This arrangement has resulted in undesired proliferation of part numbers, increased inventory of torque rods and a heightened risk that a torque rod could be installed at an improper angle, thus leading to premature failure of the torque rod.

The subject invention contemplates a new and improved torque rod assembly that eliminates the foregoing problems and others by, among other things, reducing design, production and inventory costs; increasing mounting flexibility; and eliminating assembly mistakes and resulting premature failure of torque rod assemblies.

SUMMARY OF THE INVENTION

An improved torque rod assembly is provided for connecting a vehicle axle to a frame comprising a torque rod with forged ends, each forged end having an eyelet and a cylindrical bar pin extending therethrough wherein the torque rod assembly is adaptable to a plurality of mounting angles.

In one aspect of the invention, the bar pin extending through the torque rod eyelet has a transverse bore for receiving a bolt that is movable in a radial direction in relation to the surface of the bore.

In another aspect of the invention, an aperture of each eyelet of the torque rod between the eyelet is bored at a predetermined offset angle so that the eyelet and the bar pin extending therethrough are aligned with an axis that is perpendicular to the vehicle frame.

An advantage of the assembly is that it is less expensive to manufacture than other methods while providing the same isolation benefits.

Another advantage of the assembly is that it accommodates variations in frame to axle mounting with limited stress on elastomer bushings and metals.

Another advantage of the assembly is that it provides for mounting at a number of different angles.

Another advantage of the assembly is that it eliminates the creation of flat surfaces on the ends of the bar pins.

Another advantage of the assembly is that it reduces the number of parts required to assemble or service a particular vehicle.

Another advantage of the assembly is that it reduces the amount of inventory required for assembly and service.

Another advantage of the assembly is that it eliminates mistakes during assembly or service and resultant premature torque rod failure.

Further scope of the applicability of the present invention will become apparent from the detailed description provided below. It should be understood, however, that the detailed description and specific examples, while illustrating preferred embodiments of the invention, are given by way of illustration only, since various changes and modifications within the spirit and scope of the invention will be apparent to those skilled in the art.

DESCRIPTION OF THE DRAWINGS

The present invention exists in the construction, arrangement and combination of the various parts of the device, whereby the objects contemplated are attained as hereinafter more fully set forth, specifically pointed out in the claims, and illustrated in the accompanying drawings in which:

FIG. 2 is a side view of the torque rod assembly shown in FIG. 1;

FIG. 4 is a side view the bar pin attached to the axle and/or frame;

FIG. 5 is a side view of the bar pin attached to the axle and/or frame in an alternative embodiment;

DETAILED DESCRIPTION OF THE PREFERRED EMBODIMENTS

Figure 1:
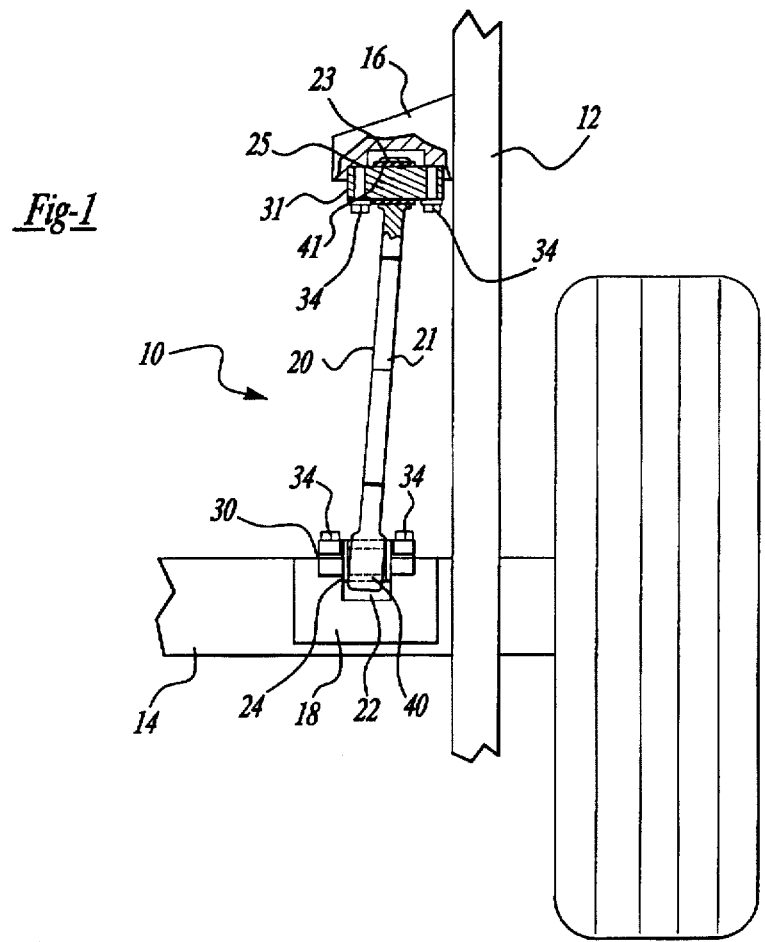
FIG. 1 is a top view of selected portions of a vehicle frame, suspension and axle system having disposed therein a torque rod assembly according to the present invention.

Referring now to the drawings, which are for purposes of illustrating the preferred embodiments of the invention only and not for purposes of limiting the same, FIG. 1 provides a view of the overall preferred embodiment of a torque rod assembly 10 installed in a vehicle. While it is appreciated that vehicle types may vary, resulting in variations of the suspension system and variations in the points of attachment of the assembly 10, as exemplary shown here, the torque rod assembly 10 generally is used in conjunction with a vehicle frame 12 and a drive axle 14. Main spring supports (not shown) connect the vehicle frame 12 to the drive axle 14.

Referring now to FIGS. 1 and 2, the torque rod assembly 10 comprises a torque rod 20 having an integral spacer 21, ends 22 and 23 and eyelets 24 and 25, respectively. Because of the high stresses involved in most applications, the torque rod ends are preferably forged rather than formed by alternative metal processing techniques. However, any sufficiently durable material or suitable method of formation may be used. The end 22 of the torque rod 20 is mounted to the drive axle 14 by a bar pin 30 and an axle mounting bracket 18. Likewise, the end 23 of the torque rod 20 is mounted to the vehicle frame 12 by a bar pin 31 and a frame mounting bracket 16. The bar pins 30 and 31 extend through elastomer bushings 40 and 41 (shown in FIG. 3) disposed in the eyelets 24 and 25, respectively. These bushings are aligned so that longitudinal axes thereof are coextensive with an axis L—L and an axis L'—L', respectively, which are substantially perpendicular to the vehicle frame so as to optimize loading conditions. As also shown in FIG. 2, the bar pins 30 and 31 are connected to the axle mounting bracket 18 and the frame mounting bracket 16, respectively, by mounting bolts 34. The bar pins 30 and 31 are substantially cylindrical in shape and may be formed from solid metal rod or metal tubing; however, any configuration or material of sufficient strength and durability will suffice.

Figure 3:
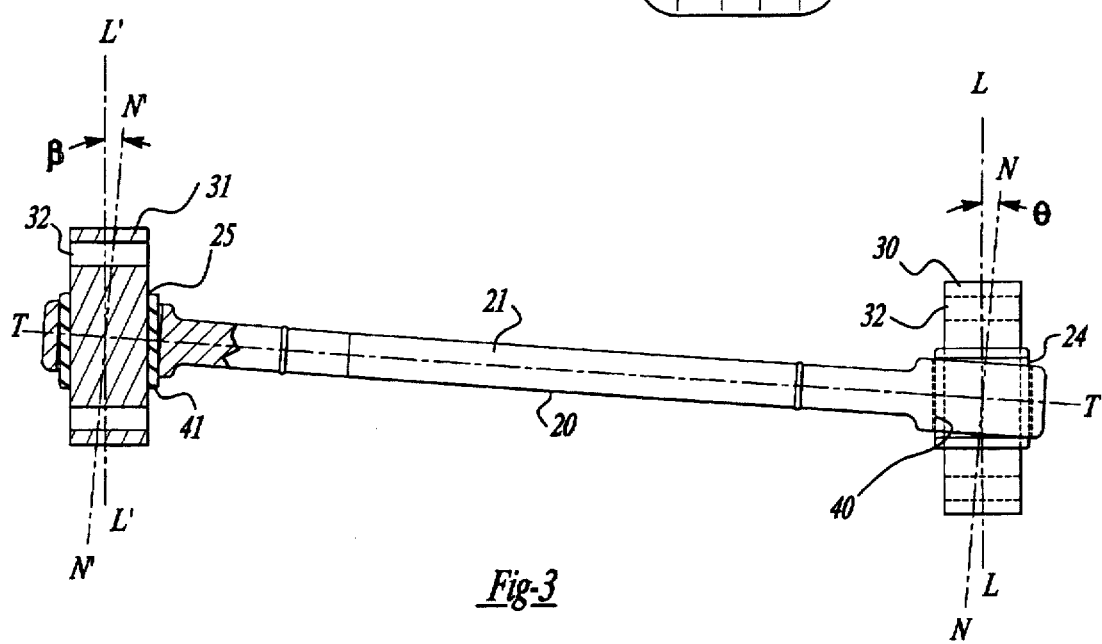
FIG. 3 is a side and partial cross-sectional view of the torque rod assembly of FIGS. 1 and 2.

Referring now more particularly to FIG. 3, the torque rod 20 is slanted to accommodate misalignment between the frame mounting bracket 16 and the axle mounting bracket 18. The eyelets 24 and 25 define respective cylinders, bores or apertures that are formed at a predetermined offset angle θ relative to an axis N—N that is normal to the axis T—T of the torque rod 20. Thus, the angle θ is the angle between the axes L—L and N—N and between the axes L'—L' and N'—N', respectively. The angle θ is preferably in the range of 1.0° to 10.0°; however, any suitable angle may be utilized. As an example, the bores of the eyelets 24 and 25 may be machined at the required angle θ. It is recognized, though, that the bores may be formed using any known technique.

In the preferred arrangement, longitudinal axes of the bar pins 30 and 31 and elastomer bushings 40 and 41 are coextensive with longitudinal axes L—L and L'—L' running through respective eyelets 24 and 25. As noted above, the longitudinal axes L—L and L'—L' are oriented substantially perpendicular to the vehicle frame 12 when the torque rod assembly 10 is installed. Accordingly, it is not necessary to bend the spacer 21 to mount the torque rod 20 to the axle 14 and the frame 12 of the vehicle. Any alignment adjustment is taken into account when determining the angle θ.

As noted above, elastomer bushings 40 and 41 are disposed in eyelets 24 and 25, respectively. These bushings are constructed of an elastomer material that will vary in configuration and composition, depending on the cost and durability desired. The bushings are press fit into the eyelets and maintained therein by a resulting friction fit. Alternatively, suitable bonding techniques may be used to secure the bushings in the eyelets. For example, known adhesives may be applied between the bushings and the inside surface of the eyelets to accomplish the goals of the subject invention.

The preferred elastomer bushing is generally cylindrical when compressed inside the eyelets and is 70 durometer points on the shore A scale. However, any material exhibiting elastomeric qualities, while still capable of withstanding the forces typically generated in a torque rod assembly, is suitable.

Although a variety of fastening devices and/or techniques may be used to attach one end of the torque rod 20 to the axle 14 and the other to the frame 12, torque rod assembly 10 uses alternative preferred arrangements. For example, and as shown in detail in FIGS. 4 and 5, to fix the torque rod 20 to the axle mounting bracket 18, as well as frame mounting bracket 16 (not shown), bolts 34 extend through the transverse bores 32 of the bar pins 30 (31), and are received in the threaded bores 36 of the bracket 18. The bracket 18(16) also has a contoured surface 42 to receive a mating portion of the cylindrical bar pin 30(31).

The bores 32 may be tapered as shown in FIG. 4 or uniformly oversized in relation to the outside diameter of bolts 34 as shown in FIG. 5. Either such configuration of bores 32 allows the bolts 34 to move in an arc. This, in turn, permits the torque rod assembly 10 to be mounted at a number of angles relative to the frame 12 and the axle 14. This configuration avoids the need to create a flat surface on the ends of the bar pins or to engineer a preset mounting angle.

FIGS. 4 and 5 also show a washer 38 having a flat surface on one side and a curved surface on an opposite side which is used to lock the bolt 34 securely to the mounting bracket 18(16). This washer also transmits forces through the various mating surfaces during vehicle operation.

Figure 6:
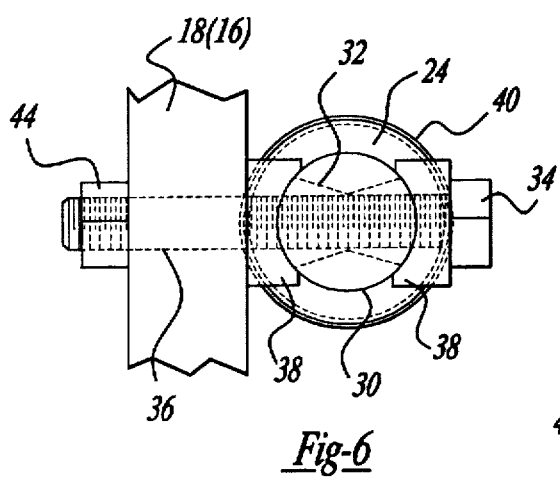
FIG. 6 is a side view of the bar pin attached to the axle and/or frame in an alternative embodiment; and, FIG. 7 is a side view of the bar pin attached to the axle and/or frame in an alternative embodiment.
Figure 7:
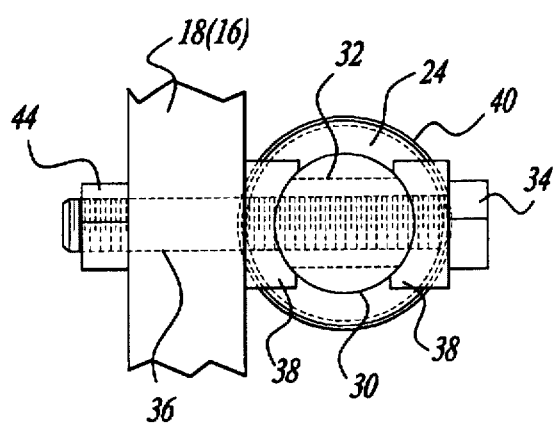

In an alternative arrangement shown in FIGS. 6 and 7 (which alternatively show tapered and oversized bores 32), no contoured surfaces are formed on the brackets. Accordingly, another washer 38 is disposed between the bracket 18(16) and the bar pin 30(31). The bolt 34, then, extends through the first washer 38, the bar pin 30, the second washer 38, and the bore 36 of the bracket 18(16). In the embodiment shown in FIGS. 6 and 7, the bolt extends further through the bracket and is secured by nut 44.

It is to be appreciated that the determination of whether to utilize the mounting technique shown in FIGS. 4–5 or that shown in FIGS. 6–7 is dependent on the vehicle into which the assembly is installed. In addition, the choice between oversized bores or tapered bores depends on the needs of the user.

It is to be further appreciated that the embodiments shown in FIGS. 1–3 may be utilized along with conventional mounting techniques instead of those shown in FIGS. 4–7. Likewise, the mounting techniques of FIGS. 4–7 may be utilized with conventional torque rod assemblies, instead of the embodiment shown in FIGS. 1–3. Varying combinations of the disclosed embodiments may also be utilized. In all of these circumstances, though, the torque rod assembly of the present invention is adaptable to a plurality of mounting angles.

The above description merely provides a disclosure of particular embodiments of the invention and is not intended for the purposes of limiting the same thereto. As such, the invention is not limited to only the above described embodiments. Rather, it is recognized that one skilled in the art could conceive alternative embodiments that fall within the scope of the invention.

Having thus described the invention, it is claimed:

1. A torque rod assembly for connecting a vehicle axle to a frame, said torque road assembly comprising:

a torque rod defining a longitudinal axis, a first end and a second end;

a forged end disposed at each of said first and second ends, said forged ends each defining a cylindrical bore extending therethrough, said cylindrical bore being disposed along a bore axis;

said bore axis defining an acute angle with respect to said longitudinal axis; and a bar pin disposed along said bore axis and extending through said cylindrical bore.

2. The torque rod assembly as defined in claim 1 wherein the bar pin is formed from solid rod.

3. The torque rod assembly as defined in claim 1 wherein the bar pin is formed from tubing.

4. The torque rod assembly as defined in claim 2 wherein the bar pin is substantially cylindrical in shape.

5. The torque rod assembly as defined in claim 3 wherein the bar pin is substantially cylindrical in shape.

6. The torque rod assembly as defined in claim 1 further comprising an elastomer bushing in each cylindrical bore between the forged end and the bar pin extending therethrough.

7. A torque rod assembly for connecting a vehicle axle to a frame comprising:

a torque rod with forged ends, each forged end having an eyelet;

a bar pin extending through each eyelet to connect the torque rod to one of the axle and the frame, each bar pin having a transverse cylindrical bore proximate each end thereof;

a bolt disposed in each of said transverse cylindrical bores; and an annular clearance dispose between said bolt and a responsive transverse cylindrical bore, said annular clearance permitting movement of said bolt with respect to said respective transverse cylindrical bore.

8. The torque rod assembly as defined in claim 7 wherein the annular clearance is tapered.

9. The torque rod assembly as defined in claim 7 wherein the annular surface is circular cylindrical.

10. The torque rod assembly as defined in claim 7 further comprising an elastomer bushing disposed in each eyelet between the eyelet and the bar pin extending therethrough.

11. The torque rod assembly as defined in claim 8 further comprising an elastomer bushing disposed extending therethrough.

12. A torque rod assembly as defined in claim 7 further comprising a nut that engages the bolt for securing the torque rod assembly to one of the axle and the vehicle frame.

13. A torque rod assembly for connecting a vehicle axle to a frame, said torque rod assembly comprising:

a torque rod defining a longitudinal axis, a first end and a second end;

a forged end disposed at each of said first and second ends, said forged ends each defining a cylindrical bore extending therethrough, said cylindrical bore being disposed along a bore axis, said bore axis defining an acute angle with respect to said longitudinal axis;

a bar pin disposed along each of said bore axes and extending through a respective cylindrical bore, each of said bar pins defining a transverse bore;

a bore disposed in each of said transverse bores, said bolt being movable in a radial direction with respect to a respective transverse bore.

* * * * *

UNITED STATES PATENT AND TRADEMARK OFFICE
CERTIFICATE OF CORRECTION

PATENT NO. : 5,791,679
DATED : August 11, 1998
INVENTOR(S) : Ronald J. McLauglin It is certified that error appears in the above-identified patent and that said Letters Patent is hereby corrected as shown below:

Col. 2, line 47, after "view" insert --of--

Col. 6, line 9, claim 11, after "disposed" insert --in each eyelet between the eyelet and the bar pin--

Signed and Sealed this

Second Day of March, 1999

Attest:

Q. TODD DICKINSON

Attesting Officer

Acting Commissioner of Patents and Trademarks